United States Patent [19]
Crinkelmeyer et al.

[11] 4,125,160
[45] Nov. 14, 1978

[54] METHOD OF CEMENTING A HIGH TEMPERATURE BOREHOLE

[75] Inventors: Oliver W. Crinkelmeyer, Kilgore, Tex.; Earl F. Morris, Wagoner, Okla.

[73] Assignee: The Dow Chemical Company, Midland, Mich.

[21] Appl. No.: 824,021

[22] Filed: Aug. 12, 1977

Related U.S. Application Data

[60] Continuation-in-part of Ser. No. 743,191, Nov. 19, 1976, abandoned, which is a division of Ser. No. 546,845, Feb. 3, 1975, abandoned.

[51] Int. Cl.$^2$ .................. E21B 33/13; E21B 33/138
[52] U.S. Cl. ........................................ 166/293; 106/90
[58] Field of Search .................. 166/283, 293; 106/89, 106/90

[56] References Cited

U.S. PATENT DOCUMENTS

| | | | |
|---|---|---|---|
| 2,646,360 | 7/1953 | Lea | 106/90 |
| 3,118,779 | 1/1964 | Leonard | 106/98 |
| 3,234,154 | 2/1966 | Martin | 260/17.5 |
| 3,351,478 | 11/1967 | Dodson et al. | 106/90 |
| 3,491,049 | 1/1970 | Gibson et al. | 106/90 X |
| 3,511,314 | 5/1970 | Scott et al. | 166/293 |
| 3,662,830 | 5/1972 | Martin | 166/293 |
| 3,689,294 | 9/1972 | Braunauer | 106/90 |
| 3,782,984 | 1/1974 | Allemand et al. | 106/90 |

*Primary Examiner*—Stephen J. Novosad
*Assistant Examiner*—George A. Suchfield
*Attorney, Agent, or Firm*—G. H. Korfhage

[57] ABSTRACT

An aqueous hydraulic cement slurry is provided which has low fluid loss properties at elevated temperatures. In addition to water and a hydraulic cement the hydraulic cement slurry contains a polyamine compound; a lignoamine and/or lignosulfonate; a borate ion releasing compound; and a carbonate and/or bicarbonate.

13 Claims, No Drawings

METHOD OF CEMENTING A HIGH TEMPERATURE BOREHOLE

CROSS-REFERENCE TO RELATED APPLICATIONS

This is a continuation-in-part application of Ser. No. 743,191 filed Nov. 19, 1976 now abandoned, which is a divisional application of Ser. No. 546,845 filed Feb. 3, 1975 now abandoned.

BACKGROUND OF THE INVENTION

Hydraulic cements, i.e., any inorganic cement that hardens or sets under water, are customarily admixed with water and emplaced as aqueous slurries. The amount of water employed may vary rather extensively dependent largely upon the fluidity of the slurry required and upon the necessary ultimate strength. In a great many uses of a hydraulic cement it is necessary for the cement slurry to be emplaced within or next to a porous medium, for example, earthen strata, e.g., in the cementing off of boreholes, grouting, dam and tunnel construction and the like. When such is the case water filters out of the slurry and into the strata during the setting period. When this occurs to any appreciable extent there usually results an uncontrolled setting rate, improper placement, impaired strength properties and usually a contamination of the surrounding strata. All of these undesirable conditions are especially to be avoided in cementing operations associated with oil, gas, water or brine wells. In an effort to lessen the loss of fluid from an aqueous hydraulic cement slurry various materials have been employed. One such material comprises a polyamine compound selected from the class consisting of polyalkylenimines, polyalkylenepolyamines and mixtures thereof. A description of these polyamine compounds and their use in hydraulic cement slurries is taught, for example, in U.S. Pat. No. 3,491,049, the teachings of which are specifically incorporated herein by reference. Although these polyamino compounds are quite satisfactory in environments wherein the temperature of the hydraulic cement slurry does not increase to above about 200° F., the fluid loss characteristics of these cement slurries are unacceptable at higher temperatures.

By practicing the principles of the present invention polyamine compound fluid loss additives can be made to function in cement slurries at elevated temperatures of 200° F. and higher by also adding to the cement slurry a specific blend of other constituents.

SUMMARY OF THE INVENTION

Hydraulic cement as employed herein is any inorganic cement that hardens or sets under water. Hydraulic cements which can be employed herein include, for example, Portland, aluminous and pozzolan cement, including cements wherein minor amounts of other oxides, e.g., iron oxide are also present. Because of its superior strength Portland cements are usually preferred. However, certain advantages are often gained by the use of other hydraulic cements in admixture with Portland cement. As employed herein the term "hydraulic cements" include minor amounts of extenders such as bentonite, gilsonite and includes such cements used either without any appreciable sand or aggregate material (such cement usually being referred to as neat cement) or such cements in admixture with a granular filling material and/or aggregate, including sand, ground limestone, pebbles and the like. Strength enhancers such as silica flour can also be employed.

The hydraulic cement slurry of the present invention includes in addition an effective amount of a polyamino compound selected from the class consisting of polyalkylenimines, polyalkylenepolyamines and mixtures thereof. The cement slurry also includes an effective amount of a water dispersible lignosulfonate, lignoamine or mixture thereof; a borate ion releasing compound and a carbonate, bicarbonate or mixture thereof. These latter constituents are employed in a weight ratio to each other and in a total amount which is effective to reduce the loss of fluid from the slurry at an elevated temperature and also to retard the setting rate of the hydraulic cement slurry at such elevated temperatures for a sufficient period of time to permit emplacement of the slurry.

DETAILED DESCRIPTION OF THE INVENTION

The operable and preferred ranges of the constituents of the hydraulic cement slurry are set forth in the following Table I:

TABLE I

|  | Operable Range | Preferred Range |
| --- | --- | --- |
| Hydraulic cement | 100 | 100 |
| *Water | about 25 to about 100 | about 35 to about 75 |
| *Borate ion releasing | about 0 to about 3** | about 1 to about 2 |
| *Lignosulfonate, lignoamine or mixture | about 1 to about 5 | about 1 to about 3 |
| *Carbonate, bicarbonate or mixture | about 0 to about 3 | about 0.1 to about 0.3 |
| *Polyamino compound | about 0.5*** to about 8 | about 0.75*** to about 3 |

*Parts by weight based on 100 parts by weight of the hydraulic cement.
**Maximum about 1 when borate ion releasing compound is a pentaborate, as hereinafter more fully explained.
***Minimum about 2 when the polyamino compound is predominately polyalkylene polyamine.

The polyamine compound employed in the practice of the present invention should have an average molecular weight of at least about 1400. Larger average molecular weights, however, are preferred, e.g., ranging from about 60,000 to 100,000 or even higher. The polyamino compound employed in the practice of the present invention may be prepared according to any one of a number of known procedures. Specific methods for preparing the polyamino compounds are taught at column 2, line 67 through column 4, line 30 of U.S. Pat. No. 3,491,049, these teachings being specifically incorporated herein by reference.

The exact amount of each constitutent and ratio of constituents to each other can vary within a wide range depending on the hydraulic cement employed. It is well known in this art that the characteristics of cement may vary even with different lots of the same type of cement obtained from the same supplier. It is not known why various cements cause these differences. Therefore, specific preferred ranges should be determined for each batch of hydraulic cement intended to be employed in a cementing operation. Various standardized testing procedures such as those developed and reported by the American Petroleum Institute under various API RP titles can be employed to determine the most preferred parameter for each batch of hydraulic cement.

The lignosulfonates which can be employed in the paractice of the present invention are selected from the group consisting of alkaline earth metal lignosulfonates, alkali metal lignosulfonates, and ammonium lignosulfonates and mixtures thereof. For example, suitable lignosulfonates are calcium lignosulfonate, magnesium lignosulfonate, barium lignosulfonate, sodium lignosulfonate, potassium lignosulfonate and lithium lignosulfonate. Of these various lignosulfonates, sodium lignosulfonate, calcium lignosulfonate and mixed salts of calcium sodium lignosulfonate are preferred because of economy and they have only a minor effect on other desirable cement properties.

The lignoamine constituent is a main derivative of lignin. In the pulping of woods, such as pine wood, the lignin is subjected to alkaline hydrolysis by sodium hydroxide and sodium sulfite, As a result of the hydrolysis some thio groups are introduced into the lignin molecule in addition to the formation of a sodium salt of the lignin. The treated lignin thus obtained may be further treated to induce an alkyl amine group in the molecule through a methylene linkage. The amine groups are the lower alkyl amines having alkyl radicals of up to 4 carbon atoms and may be primary, secondary or tertiary amines. The product may also contain sodium or other metal substituents.

The borate ion releasing compound may be boric acid or a water soluble borate and is preferably employed when it is desired to retard the cement. Of the latter compounds natural minerals such as borax, kernite and ulexite may be employed. Other water soluble salts such as alkali and alkaline earth metal borates can also be employed. Specific salts which are useful include, for example, $LiBO_2 \cdot 8H_2O$; $NaBO_2 \cdot 4H_2O$; $Li_2B_4O_7 \cdot H_2O$; $Na_2B_4O_7 \cdot 10H_2O$; $LiB_5O_8 \cdot 5H_2O$; $NaB_5O_8 \cdot 5H_2O$; $KB_5O_8 \cdot 4H_2O$ and the like.

As indicated, pentaboric acid salts can be employed in the practice of the present invention. Pentaboric acid salts which may be employed include alkaline earth metal pentaborates, alkali metal pentaborates and ammonium pentaborate. However, care must be taken in use of the pentaborates since it appears that above certain levels they are actually detrimental to the fluid loss properties of the polyamino compound; alternatively, of course, one may simply employ as the borate ion releasing compound, a compound which is not a pentaboric acid salt. The concentration above which the pentaborates become detrimental is generally about 1 percent by weight of cement, although the precise concentration at which the sharp and easily identifiable objectionably detrimental effect occurs depends on the particular pentaborate and cement; one skilled in the art can readily determine this concentration for a particular pentaborate by a few routine laboratory tests. For example, by comparing Tests 24, 25, and 26 in Table II, it can readily be seen that though the fluid loss at 1% sodium pentaborate was not quite as good as that at 0.5%, the fluid loss at both 0.5 and 1% was very satisfactory at less than 100 ml/30 min, whereas a composition containing only a slightly higher amount of sodium pentaborate (1.3%) had virtually no fluid loss control with a blow out occurring so soon as to give a calculated 30 minute fluid loss figure of over 500 ml/30 min. Similarly, Tests 31-36 in Table II show that for potassium pentaborate, the sharp break occurs at between 0.70 and 0.75 percent.

Optionally the hydraulic cement slurry may also contain a water soluble carbonate or bicarbonate. It has been found that the addition of a small amount of a carbonate, bicarbonate, or mixture, generally improves fluid loss control and also permits a reduction in the amount of the polyamino compound which is necessary. As with the pentaborates, however, high concentrations may actually be detrimental in some cement systems. Therefore, for each cement system the preferred amount should be determined prior to preparation of large quantities of the cement slurry. Examples of bicarbonates and carbonates which can be employed include alkali metal carbonates and bicarbonates such as sodium carbonate and sodium bicarbonate and the like.

Tests were run in a laboratory to determine the fluid loss properties of certain hydraulic cement slurry systems. These tests include both specific examples of the present invention and also comparative examples. The tests were run according to API RP 10B using a Bariod high temperature, high pressure fluid loss apparatus and a 325 mesh (U.S. Standard Sieve Series) stainless steel screen. A 500 psi differential pressure was employed in all tests. In running the tests a hydraulic cement slurry was mixed at room temperature according to the API procedure in a Waring Blendor and then heated for 20 minutes in an atmospheric consistiometer at 200° F. The slurry was then transferred to the preheated fluid loss cell. The cell was sealed under 150 psi and heated to a starting temperature (300° or 350° F. as shown in the following Table II). The test was run by applying 700 psi pressure to the top of the cell and 200 psi to the bottom through the back pressure receiver apparatus. The temperature in the cell was allowed to rise during the test period. Heat was continuously applied to the cell during the test so that the final temperature of the hydraulic cement slurry is a function of the length of the test. The figures in the following Table II are for a fluid loss at a test time of 30 minutes or less. The base hydraulic cement slurry to which various constituents were added consisted of Lone Star Portland Class H cement containing 35 percent by weight of silica flour and 56 percent by weight of water (both percentages are based on the weight of the hydraulic cement). Various constituents were also added to various samples of the base hydraulic cement and the fluid loss properties thereof determined. The constituents are shown as being added in an amount based on percent by weight of dry cement unless otherwise noted. Table II reports the results of these fluid loss tests.

TABLE II

| Test No. | PEI | GH | B | A | LS | HEC | SB | SC | SNS | CMHEC | Pentaborate[4] | Fluid loss ml/30 min. |
|---|---|---|---|---|---|---|---|---|---|---|---|---|
| 1 | .6gls | — | 2 | — | 2 | — | 0.1 | — | — | — | — | 46 |
| 2 | .6gls | — | 2 | — | 2 | — | 0.1 | — | — | — | — | 64 |
| 3 | .6gls | — | 2 | — | — | — | 0.1 | — | — | — | — | None |
| 4 | .6gls | — | 2 | 2 | — | — | 0.1 | — | — | — | — | 80–100 |
| 5 | .6gls | — | 1 | — | 1 | — | 0.1 | — | — | — | — | 24 |
| 6 | .6gls | — | — | — | 1 | — | 0.1 | — | — | — | — | 50/25min. |
| 7 | .6gls | — | — | — | 1 | — | 0.2 | — | — | — | — | 25 |
| 8 | 2% | — | 1 | — | 2 | — | 0.3 | — | — | — | — | 16 |
| 9 | — | 1 | — | — | — | 0.75 | — | — | 0.75 | — | — | 300 |
| 10 | — | 1 | — | — | — | — | — | — | 1 | 0.5 | — | 225 |
| 11 | — | — | 1 | — | 2 | — | — | — | 1 | 0.5 | — | 500+[5] |
| 12 | — | — | 1 | — | 2 | 0.75 | — | — | 0.75 | — | — | 500+ |

TABLE II-continued

| Run | PEI | GH | B | LS | HEC | SB | SC | SNS | CMHEC | A | Other | Result |
|---|---|---|---|---|---|---|---|---|---|---|---|---|
| 13 | — | — | 1 | — | 2 | — | — | — | — | — | — | 500+ |
| 14 | 2 | — | 1 | — | 2 | — | 0.3 | — | — | — | — | 34 |
| 15 | — | 1 | — | — | — | — | — | — | 2 | — | — | 325/4min. |
| 16 | 3 | — | 1.9 | — | 2.1 | — | — | — | — | — | — | 14 |
| 17 | 0.75 | — | 1 | — | 1 | — | 0.1 | — | — | — | — | 30 |
| 18 | 1.5 | — | 1 | — | 1 | — | — | — | — | — | — | 500 |
| 19 | 1.5 | — | 1 | — | 1 | — | 0.1 | — | — | — | — | 42 |
| 20 | 1.5 | — | 1 | — | 1 | — | 0.3 | — | — | — | — | 30 |
| 21 | 1.5 | — | — | — | 1 | — | 0.1 | — | — | — | — | 108 |
| 22 | 1.5 | — | 4 | — | 4 | — | 0.3 | — | — | — | — | 500+ |
| 23 | 2.25 | — | 3 | — | 3 | — | — | — | — | — | — | 140 |
| 24 | 2.25 | — | — | — | 3 | — | 0.3 | — | — | — | Sodium, 0.5 | 18 |
| 25 | 2.25 | — | — | — | 3 | — | 0.3 | — | — | — | Sodium, 1 | 60 |
| 26 | 2.25 | — | — | — | 3 | — | 0.3 | — | — | — | Sodium, 1.3 | 500+ |
| 27 | 2 | — | 1 | — | 2 | — | 0.3 | — | — | — | — | 20 |
| 28[1] | 2 | — | 1 | — | 2 | — | 0.3 | — | — | — | — | 32 |
| 29[2] | 2 | — | 1 | — | 2 | — | 0.3 | — | — | — | — | 75 |
| 30[3] | 2 | — | 1 | — | 2 | — | 0.3 | — | — | — | — | 500+ |
| 31 | 2.25 | — | — | — | 3 | — | 0.3 | — | — | — | Potassium, 0.50 | 38 |
| 32 | 2.25 | — | — | — | 3 | — | 0.3 | — | — | — | Potassium, 0.60 | 36 |
| 33 | 2.25 | — | — | — | 3 | — | 0.3 | — | — | — | Potassium, 0.70 | 40 |
| 34 | 2.25 | — | — | — | 3 | — | 0.3 | — | — | — | Potassium, 0.75 | 500+ |
| 35 | 2.25 | — | — | — | 3 | — | 0.3 | — | — | — | Potassium, 0.80 | 500+ |
| 36 | 2.25 | — | — | — | 3 | — | 0.3 | — | — | — | Potassium, 1.0 | 500+ |
| 37[6] | 0.75 | — | 1 | — | 2 | — | 0.3 | — | — | — | — | 500+ |
| 38[6] | 1.5 | — | 1 | — | 2 | — | 0.3 | — | — | — | — | 500+ |
| 39[6] | 2.0 | — | 1 | — | 2 | — | 0.3 | — | — | — | — | 130 |
| 40[6] | 2.0 | — | 1 | — | 2 | — | 0.3 | — | — | — | — | 140 |
| 41[6] | 2.5 | — | 1 | — | 2 | — | 0.3 | — | — | — | — | 110 |
| 42[6] | 3.0 | — | 1 | — | 2 | — | 0.3 | — | — | — | — | 65 |

Tests 1–7 and 14–36 were started at 350° F
Tests 8–13 were started at 300° F
PEI is polyethylenimine (Tests 1–27 PEI had molecular weight ranging from about 40,000 to about 60,000)
In Tests 1–27 an aqueous solution containing about 33 percent by weight of the PEI described directly above was employed
GH is sodium glucoheptonate
B is borax
LS is lignosulfonate
HEC is hydroxyethyl cellulose
SB is sodium bicarbonate
SC is sodium carbonate
SNS is sodium naphthalene sulfonate
CMHEC is carboxymethyl hydroxyethyl cellulose
A is 1:1 by weight mixture of lignoamine and sodium glucoheptonate

[1] PEI of 100,000 MW
[2] PEI of 18,000 MW
[3] Polyalkylenepolyamine still bottoms. Later reruns of this data as Runs 39 and 40 suggest there may have been an error in calculating the active weight of the polyamine compound in Run 30. See also note 6.
[4] Includes water of hydration
[5] "500+" means the composition had virtually no fluid loss control, with gas blow through occurring in less than a minute
[6] Runs 37–42 prepared from 600 g Lone Star H cement, 210 grams silica flour, 12 grams calcium lignosulfonate, 6 grams borax, 1.8 grams sodium bicarbonate, and the following quantities of an aqueous commercial polyalkylenepolyamine product substantially the same as that used in Run 30, but from a different lot. The commercial product contained about 37 weight percent active PAPA and about 13 percent alkali metal halides. Quantities in the "PEI" column in the table are based on active PAPA.

|  | ml. Commercial product (sp. gr. 1.14) | ml. Additional water |
|---|---|---|
| Run 37 | 10.7 | 330 |
| Run 38 | 21.3 | 324 |
| Run 39 | 28.5 | 320 |
| Run 40 | 28.5 | 320 |
| Run 41 | 35.6 | 316 |
| Run 42 | 42.7 | 312 |

To cement an 18,000 foot well having a bottom hole circulating temperature of 400° F., a bottom hole static temperature of 440° F. and a bottom hole pressure of 20,000 psi the following hydraulic cement slurry can be employed:

Portland cement Class H and, based on the weight of the Portland cement, 35 percent of silica sand, 28 percent hematite, 46 percent water; 1.1 percent calcium lignosulfonate; 1.1 percent borax; and 0.1 percent sodium bicarbonate, and also 0.5 gallons per sack of Portland cement of an aqueous dispersion containing about 33 percent by weight polyethylenimine having a molecular weight ranging from about 40,000 to about 60,000.

This cement slurry has thickening time of greater than 5 hours, a fluid loss of 24 cc/30 minutes and develops the following compressive strengths:

| Temperature | Time | Compressive Strength psi |
|---|---|---|
| 340° F | 72 hrs. | 4550 |
| 440° F | 24 hrs. | 2720 |
| 440° F | 72 hrs. | 4165 |

To cement a 6,000 foot geothermal well having a bottom hole circulating temperature of 450° F., a bottom hole static temperature of about 550° F. and a bottom hole pressure of 3000 psi the following cement slurry can be employed:

Portland cement Class G containing the following constituents as percent by weight of the dry cement: 35 percent silica sand; 54 percent water; 1.2 percent calcium lignosulfonate; 1.2 percent borax; 0.3 percent sodium bicarbonate and 0.5 gallons per sack of dry cement of an aqueous dispersion containing 33 percent by weight of polyethylenimine having a molecular weight ranging from about 40,000 to about 60,000. This cement slurry has the following characteristics:

```
        Thickening time - 3 hours
        Fluid loss      - 20 ml/30 minutes
              Strengths:
Temperature        Time              psi
  350° F           48 hours           3000
  450° F           24 hours           1455
  550° F           24 hours           3900
```

What is claimed is:

1. A method of cementing in a borehole penetrating a subterranean formation wherein the temperature of the area to be cemented results in a hydraulic cement slurry being subjected to an elevated temperature of at least about 200° F., wherein a settable hydraulic cement slurry is emplaced in said area to be cemented and said slurry contains a fluid loss agent selected from the class consisting of a polyalkylene polyamine, a polyalkyleneimine or a mixture thereof, the improvement which comprises:
   including in addition in said hydraulic cement slurry, as parts by weight per 100 parts of dry hydraulic cement, from about 1 to about 5 parts of a compound selected from the group consisting of a lignosulfonate, a lignoamine or a mixture thereof; and a compound selected from the group consisting of a water soluble carbonate, bicarbonate, or mixture thereof, in an amount from that which is effective to enhance the fluid loss property of said surry up to about 3 parts.

2. The method of claim 1 wherein the slurry includes in addition up to about 3 parts of a water soluble borate ion releasing compound, provided that when said borate ion releasing compound is a pentaboric acid salt, said salt is present in an amount of about 1 part or less which is not sharply detrimental to the fluid loss property of the slurry.

3. The method of claim 2 wherein said borate ion releasing compound is boric acid or a water soluble borate.

4. The method of claim 1 wherein the slurry includes in addition up to about 3 parts borax.

5. The method of claim 4 wherein the polyamine is polyethylenimine.

6. The method of claim 1 wherein the slurry includes from about 0.1–0.3 parts of a composition selected from the group consisting of a water soluble carbonate, bicarbonate, or a mixture thereof.

7. The method of claim 1 wherein the slurry comprises
   (a) hydraulic cement, and the following expressed as parts by weight per 100 parts of said hydraulic cement:
   (b) water, from about 35 to about 75 parts;
   (c) from about 1 to about 3 parts of a compound selected from the group consisting of a lignosulfonate, a lignoamine or a mixture thereof;
   (d) from about 0.75 to about 3 parts of a polyamine compound provided that when said polyamine compound is predominately a polyalkylenepolyamine, said range is from about 2 to about 8;
   (e) from about 0.1 to about 0.3 parts of a composition selected from the group consisting of a water soluble carbonate, bicarbonate, or mixture thereof; and
   (f) from about 1 to about 2 parts of a water soluble borate ion releasing compound, provided that said borate ion releasing compound is not a pentaboric acid salt.

8. The method of claim 7 wherein said polyamine compound is selected from the group consisting of a polyalkylenimine, polyalkylene polyamine or a mixture thereof.

9. The method of claim 8 wherein said polyamine compound is polyethylenimine.

10. The method of claim 7 wherein the lignosulfonate is selected from the group consisting of alkaline earth metal lignosulfonate, alkali metal lignosulfonate, ammonium lignosulfonate or a mixture of two or more of said lignosulfonates.

11. The method of claim 7 wherein the lignoamine is a lower alkyl lignoamine wherein said alkyl radical contains up to four carbon atoms.

12. The method of claim 7 wherein the borate ion releasing compound is boric acid or a water soluble borate.

13. The method of claim 12 wherein the borate ion releasing compound is borax and the polyamine is polyethylenimine.

* * * * *